United States Patent
Suhas et al.

(10) Patent No.: US 10,417,121 B1
(45) Date of Patent: Sep. 17, 2019

(54) MONITORING MEMORY USAGE IN COMPUTING DEVICES

(75) Inventors: Suhas Suhas, Sunnyvale, CA (US); William N. Pohl, Morgan Hill, CA (US); Amit Ranpise, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 725 days.

(21) Appl. No.: 13/330,002

(22) Filed: Dec. 19, 2011

(51) Int. Cl.
*G06F 12/02* (2006.01)
*G06F 12/08* (2016.01)
*G06F 12/00* (2006.01)

(52) U.S. Cl.
CPC .............. *G06F 12/02* (2013.01); *G06F 12/08* (2013.01); *G06F 12/00* (2013.01)

(58) Field of Classification Search
CPC ........... G06F 12/00; G06F 12/08; G06F 17/21
See application file for complete search history.

(56) References Cited

U.S. PATENT DOCUMENTS

| | | | | |
|---|---|---|---|---|
| 5,978,893 | A * | 11/1999 | Bakshi | G11C 8/12 365/230.03 |
| 6,041,406 | A | 3/2000 | Mann | |
| 6,154,823 | A * | 11/2000 | Benayon | G06F 12/023 711/170 |
| 6,314,530 | B1 | 11/2001 | Mann | |
| 6,442,661 | B1 * | 8/2002 | Dreszer | G06F 12/023 707/999.202 |
| 7,739,689 | B1 | 6/2010 | Spertus et al. | |
| 8,209,510 | B1 * | 6/2012 | Thathapudi | G06F 12/145 711/163 |
| 8,245,239 | B2 * | 8/2012 | Garyali | G06F 12/0269 711/170 |

(Continued)

FOREIGN PATENT DOCUMENTS

JP        0223434 A        1/1990

OTHER PUBLICATIONS

Postel, Jon, "Internet Protocol" Darpa Internet Program—Protocol Specification, RFC: 791, available at http://www.ietf.org/rfc/rfc791.txt, Sep. 1981, 49 pgs.

(Continued)

*Primary Examiner* — Mohamed M Gebril
(74) *Attorney, Agent, or Firm* — Shumaker & Sieffert, P.A.

(57) ABSTRACT

In general, techniques are described for monitoring memory usage in computing devices. A computing device comprising a memory and a control unit that executes a kernel of an operating system having kernel sub-systems may implement the techniques. A memory manager kernel subsystem, in response to requests for amounts of the memory from other one kernel sub-systems, allocates memory blocks from the memory. The memory manager, in response to requests to de-allocate one or more of the allocated memory blocks, determines the corresponding requested amounts of memory and sizes of the de-allocated blocks. The memory manager then generates memory usage information based on the determined requested amounts of memory and the determined ones of the two or more different sizes. The memory usage information specifies usage of the memory in terms of the two or more different sizes of the allocated plurality of memory blocks.

32 Claims, 4 Drawing Sheets

(56) References Cited

U.S. PATENT DOCUMENTS

| | | | | |
|---|---|---|---|---|
| 8,316,203 | B2* | 11/2012 | Eguchi | G06F 11/1466 711/162 |
| 2003/0159133 | A1 | 8/2003 | Ferri et al. | |
| 2004/0123274 | A1 | 6/2004 | Inagaki et al. | |
| 2005/0060509 | A1* | 3/2005 | Loafman | G06F 12/023 711/170 |
| 2006/0075310 | A1 | 4/2006 | Tagawa | |
| 2006/0143531 | A1 | 6/2006 | Kilian et al. | |
| 2007/0136546 | A1* | 6/2007 | Krauss | G06F 11/3409 711/170 |
| 2008/0034168 | A1* | 2/2008 | Beaman | G06F 9/544 711/154 |
| 2008/0235668 | A1 | 9/2008 | Browning et al. | |
| 2009/0125693 | A1* | 5/2009 | Idicula | G06F 17/2247 711/170 |
| 2010/0095081 | A1* | 4/2010 | McDavitt | G06F 12/023 711/171 |
| 2010/0251026 | A1 | 9/2010 | Panchamukhi et al. | |
| 2011/0126172 | A1 | 5/2011 | Lakshminarayanachar et al. | |
| 2011/0296133 | A1* | 12/2011 | Flynn | G06F 11/1048 711/171 |
| 2012/0072686 | A1* | 3/2012 | Iyengar | G06F 12/02 711/162 |
| 2012/0303927 | A1* | 11/2012 | Goldberg | G06F 12/02 711/171 |
| 2013/0046951 | A1* | 2/2013 | Jones | G06F 12/023 711/171 |
| 2013/0132699 | A1* | 5/2013 | Vaishampayan | G06F 11/073 711/170 |

OTHER PUBLICATIONS

Harrington, D. et al. "An Architecture for Describing Simple Network Management Protocol (SNMP) Management Frameworks", Network Working Group, RFC 3411, The Internet Society, Dec. 2002, 60 pgs.

Deering, S. et al. "Internet Protocol, Version 6 (IPv6) Specification", Network Working Group, RFC 2460, The Internet Society, Dec. 1998, 37 pgs.

Durand et al., "Dual-Stack Lite Broadband Deployments Following IPv4 Exhaustion," draft-ietf-softwire-dual-stack-lite-06,4 Internet-Draft, Aug. 11, 2010, 35 pp.

Hankins et al., "Dynamic Host Configuration Protocol for IPv6 (DHCPv6) Options for Dual-Stack Lite," draft-ietf-softwire-ds-lite-tunnel-option-03, Internet-Draft, Jun. 24, 2010, 9 pp.

Brockners et al., "Gateway Initiated Dual-Stack Lite Deployment," draft-ietf-softwire-gateway-init-ds-lite-00, Internet-Draft, May 13, 2010, 15 pp.

Townsley et al., "IPv6 Rapid Development on IPv4 Infrastructures (6rd)," draft-ietf-softwire-ipv6-6rd-10, May 19, 2010, 20 pp.

Wikipedia entry, "Path MTU Discovery," last modified Sep. 16, 2010, 2 pp., http://en.wikipedia.org/wiki/Path_MTU_Discovery.

PowerPoint presentation, "Softwires," G6 Association, dated Sep. 22, 2008, 7 pp., http://www.afrinic.net/training/presentation/Slides%20Softwires.pdf.

Carpenter et al., "Connection of IPv6 Domains via IPv4 Clouds," RFC 3056, Feb. 2001, 20 pp.

Despres, "IPv6 Rapid Deployment on IPv4 Infrastructures (6rd)," RFC 5569, Jan. 2010, 11 pp.

"Intel 64 and IA-32 Architectures Software Developer's Manual" vol. 3B: System Programming Guide, Part 2, Chapter 19, p. 3-152, Intel Corporation, Jun. 2009.

U.S. Appl. No. 13/189,186, by Samuel Jacob, filed Jul. 22, 2011.
U.S. Appl. No. 13/193,138, by Alain Durand, filed Jul. 28, 2011.
U.S. Appl. No. 12/964,473, by Olivier Vautrin, filed Dec. 9, 2010.
U.S. Appl. No. 12/952,908, by Tarun Saxena, filed Nov. 23, 2010.

* cited by examiner

MONITORING MEMORY USAGE IN COMPUTING DEVICES

TECHNICAL FIELD

The invention relates to computing device and, more specifically, memories used to store data in computing devices.

BACKGROUND

A computing device generally executes an operating system that provides a common interface with which a user may interact with the hardware components of the computing device. Via this operating system interface, the user may configure hardware of the computing device, store data (such as photos, videos, computer programs, documents, etc.) to file systems maintained by the operating system and mapped to storage units and/or memories of the computing device, install computer programs that generally execute within an execution environment presented by the operating system, initiate the execution of the various installed computer programs and generally operate or otherwise control the computing device in a wide variety of ways.

Modern operating systems generally include a number of components or modules, including a so-called "kernel," memory manager, file system manager, network stack manager, libraries, device drivers and graphical user interface (GUI) module to name a few examples. Of these components, the kernel represents what is commonly considered as the core component that provides, with the aid of firmware and device drivers, the most basic or core level of control over the various hardware components of the computing device. The kernel may provide a level of abstraction of the physical hardware to allow programs to execute on a variety of different physical hardware implementations. In some operating system implementations, various components described as being separate from the kernel, such as the memory manager, file system manager, network stack manager and GUI module, may be integrated into the kernel to provide these core functions.

Typically, a set portion of underlying hardware resources, such as a portion of one or more memories and processor cycles, are allocated for use by the kernel. As kernels are changed over time, various features may be added or optimization may be performed with respect to the kernel, often in the form of patches or updates. As a result of these changes, the kernel may begin to incrementally utilize more hardware resources with the result that hardware resources available for non-kernel programs have decreased. Users of the computing device may eventually notice this decrease in available hardware resources (meaning hardware resources that are available for use by the user and not allocated for use by the kernel), requesting that the decrease in available hardware resources be fixed. Yet, attempting to identify and overcome issues involving kernel hardware resource use is a difficult, time intensive process as modern kernels have become significantly more complicated and provide little, if any, feedback or other type of debugging information that enable identification of issues involving kernel hardware resource use.

SUMMARY

In general, techniques are described for determining memory usage information for memory allocated for use by a kernel of an operating system executing on a computing device. The techniques enable the kernel to store memory usage information in a two-dimensional data structure, where the horizontal axis of this two dimensional data structure represents the different sizes or amounts of memory blocks being allocated in response to requests for sizes or amounts of memory blocks by subsystems (which may also be referred to as "kernel processes") of the kernel, while the vertical axis denotes the different kernel subsystems that issued the memory request. In this manner, the techniques enable the kernel to provide memory usage information at a granularity finer than that typically provided by conventional operating systems in that this memory usage information provides memory use not only by type of kernel sub-system (or so-called "type") but also by the different sizes of the allocated memory blocks per type. By providing this type-by-allocated size memory usage information, the techniques may facilitate a number of forms of analysis of kernel memory usage at a finer level of detail so as to potentially enable programmers to more easily identify the cause of consumption of memory that eventually leads to a reduction in available memory.

In one aspect, a method comprises, in response to requests for amounts of memory, allocating a plurality of memory blocks from a memory of a computing device such that the allocated plurality of memory blocks have two or more different sizes larger than the requested amounts of memory, in response to requests to de-allocate one or more of the allocated plurality of memory blocks, determining the corresponding requested amounts of memory and the corresponding ones of the two or more different sizes, and generating memory usage information that specifies the determined requested amounts of memory in terms of the two or more different sizes of the allocated plurality of memory blocks.

In another aspect, a computing device comprises a memory and a control unit that executes a kernel of an operating system having a plurality of kernel sub-systems. One of the kernel sub-systems comprises a memory manager that, in response to requests for amounts of the memory from at least one other one of the kernel sub-systems, allocates a plurality of memory blocks from the memory such that the allocated plurality of memory blocks have two or more different sizes larger than the requested amounts of memory. The memory manager, in response to requests to de-allocate one or more of the allocated plurality of memory blocks from the at least one other one of the kernel sub-systems, determines the corresponding requested amounts of memory and the corresponding ones of the two or more different sizes. The memory manager generates memory usage information based on the determined requested amounts of memory and the determined ones of the two or more different sizes, wherein the memory usage information specifies usage of the memory in terms of the two or more different sizes of the allocated plurality of memory blocks.

In another aspect, a non-transitory computer-readable medium comprises instructions for causing a one or more processors to in response to requests for amounts of memory, allocate a plurality of memory blocks from a memory of a computing device such that the allocated plurality of memory blocks have two or more different sizes larger than the requested amounts of memory, in response to requests to de-allocate one or more of the allocated plurality of memory blocks, determines the corresponding requested amounts of memory and the corresponding ones of the two or more different sizes and generate memory usage information based on the determined requested amounts of memory and the determined ones of the two or more different sizes, wherein the memory usage information specifies usage of the memory in terms of the two or more different sizes of the allocated plurality of memory blocks.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
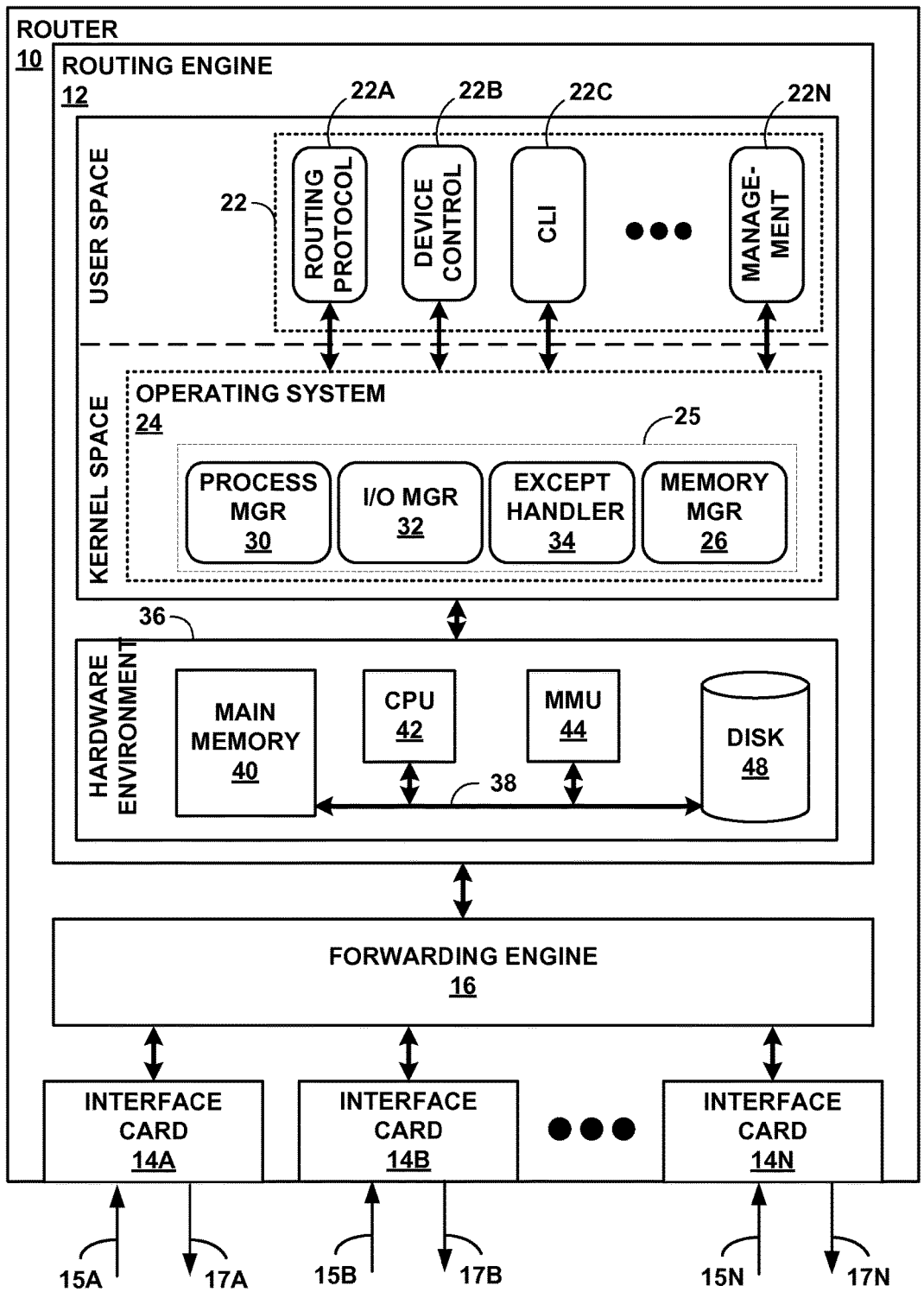
FIG. 1 is a block diagram illustrating an exemplary computing device that implements the techniques described in this disclosure.

FIG. 1 is a block diagram illustrating an exemplary computing device, e.g., a router 10, that performs the kernel memory tracking techniques described in this disclosure. Although described below with respect to a particular computing device, i.e., router 10 in this example, other network and general-purpose computing devices, such as switches, intrusion detection and/or prevention systems, desktop/laptop computers, hand-held devices, gaming consoles, and any other device for which memory usage information of this sort may be useful, may implement the techniques described in this disclosure.

In the illustrated example, router 10 includes a routing engine 12, a plurality of physical interface cards 14A-14N (collectively, IFCs 14) and a forwarding engine 16. Routing engine 12 generates forwarding information for forwarding engine 16 in accordance with routing information received from other network devices with which router 10 communicates. Forwarding engine 16 forwards incoming packets received via inbound links 15A-15N to an appropriate next hop, determined from the forwarding information, via outbound links 17A-17N. Routing engine 12 may form at least a part of a so-called "routing plane" or "control plane" of router 10 while forwarding engine 16 and IFCs 14 may form at least a part of a so-called "data plane" or "forwarding plane."

Forwarding engine 16 and routing engine 12 may be implemented in solely in hardware or in software or firmware in combination with the hardware. For example, forwarding engine 16 and routing engine 12 may comprise one or more processors that execute software instructions to perform the functions described herein. In this example, the software instructions may be stored on a non-transitory computer-readable medium, such as computer memory or hard disk.

In the example of FIG. 1, routing engine 12 includes hardware components 36 that comprise central processing unit 42 ("CPU 42"), memory management unit 44 ("MMU 44"), main memory 40, and disk 48, all of which are interconnected via system bus 38. CPU 42 executes program instructions loaded into main memory 40 from disk 48 in order to operate routing engine 12. MMU 44 handles memory access requests, including read and write requests, to main memory 40 by CPU 42. CPU 42 and MMU 44 may each comprise one or more general-or special-purpose processors, such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure suitable for implementation of the techniques described herein. In some instances, MMU 44 is integrated into CPU 42. In other instances, MMU 44 and CPU 42 are additionally coupled via an address bus. In such instances, MMU 44 exchanges address information with CPU 42 via the address bus, while CPU 42 communicates with main memory 40 via system bus 38. In these instances, MMU 44 and CPU 42 may be additionally coupled via a signal line that permits CPU 42 to indicate to MMU 44 whether the current memory access is a read access or a write access as well as a second signal line that permits MMU 44 to raise an exception to CPU 42.

Disk 48 represents any form of non-transitory computer-readable storage media, including volatile and/or non-volatile, removable and/or non-removable non-transitory computer-readable media implemented in any method or technology for storage of information, such as processor-readable instructions, data structures, program modules, or other data. Non-transitory computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by routing engine 12.

Main memory 40 comprises one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by a computer. Main memory 40 provides a physical address space composed of addressable memory locations. Routing engine 12 partitions the physical address space of main memory 40 into user space, which is allocated for running user processes, and kernel space, which is protected and generally inaccessible by user processes.

Routing engine 12 further includes operating system 24, executing in kernel space, that provides an operating environment for multiple daemons 22A-22N ("daemons 22"), which run as processes in the user space of main memory 40. One example of operating system 24 is the JUNOS™ operating systems provided by Juniper Networks, Inc. of Sunnyvale, Calif. Another example of operating system 24 is Berkeley Software Distribution, or BSD, which is available in free and commercial variants. Daemons 22 include routing protocol daemon 22A, device control daemon 22B, command-line interface 22C, and management daemon 22N. Various embodiments of routing engine 12 may include more, fewer, or different daemons.

Operating system 24 includes a kernel 25, where certain kernel processes 26-30 are shown in the example of FIG. 1. These kernel processes 26-30 are merely presented for purposes of example and the techniques should not be limited in this respect to a kernel requiring any one of these processes 26-30, including process manager 30 ("process mgr 30"), input/output ("I/O") manager 32 ("I/O mgr 32"), exception handler 34 ("except handler 34"), and memory manager 26 ("memory mgr 26").

Process manager 30 multi-tasks routing engine 12 processes by initializing, scheduling, and switching daemons 22 and processes for operating system 24 for access to routing engine 12 resources, especially CPU 42. I/O manager 32 provides an interface, e.g., system calls, to enable daemons 22 to exchange data and/or instructions with main memory 40, disk 48, and forwarding engine 16 or to direct the components to exchange data and/or instructions with each other. I/O manager 32 includes device drivers for main memory 40, disk 48, and forwarding engine 16. In some examples, router 10 may interface with peripheral devices, such as a keyboard, a computer mouse, or a display device (not shown). In such embodiments, I/O manager 32 provides interfaces to the peripherals.

Exception handler 34 enables operating system 24 and/or daemons 22 to react to a signal (or "exception") generated by hardware of routing engine 12 (e.g., CPU 42 or MMU 44) in response to an instruction currently being handled by the hardware. For example, CPU 42 may generate an exception in response to an unrecognized instruction that CPU 42 is unable to execute. As another example, MMU 44 may generate an exception in response to an instruction that directs CPU 42 to overwrite a memory location in kernel space. Exceptions cause exception handler 34 to take over the execution thread, and, depending on the nature of the exception, perform one or more of a number of steps that range from ignoring the exception to notifying or ending the execution of an offending process that causes the exception. Memory manager 26 controls the allocation, use, and deallocation of physical address space provided by main memory 40 for routing engine 12 processes, including kernel processes 26-34 and daemons 22.

In exemplary routing engine 12, memory manager 26 cooperates with MMU 44 to implement virtual memory techniques and thereby provide a separate virtual address space for each of daemons 22. Virtual memory techniques allow each of daemons 22 to experience the illusion of an exclusive, contiguous addressable memory space when in fact daemons 22 share the physical address space provided by main memory 40. In addition, the virtual memory techniques permit a larger address space than that provided by main memory 40, which simplifies program development and enables multi-tasking of memory-intensive processes. The total amount of address space required by processes running in routing engine 12 may exceed the amount of physical address space provided by main memory 40. To increase the amount of address space available beyond the limitations of main memory 40, memory manager 26 relocates blocks of memory from active primary memory (main memory 40) to disk 48, which provides secondary memory storage. Memory manager 26 swaps such memory blocks to and from main memory 40 and disk 48 as needed in order to provide physical memory space for an executing process.

Memory manager 26 typically implements a page-based memory system to further virtual memory techniques by partitioning the virtual and physical address spaces into a plurality of fixed-length blocks referred to herein as pages. For example, each page may comprise 4 KB of contiguous address space. As another example, a page may comprise 4 MB of contiguous address space. Memory manager 26 swaps pages in main memory 40 to/from disk 48 using the process described above, which is hereinafter referred to as "paging." The virtual address spaces for daemons 22 include virtual pages that each, if allocated, map to a physical page in main memory 40. Memory manager 26 maintains, for each process, a set of page tables (not shown in FIG. 1) in kernel space that establishes a mapping between a virtual address/virtual page number for the process and one of the physical pages. The virtual address itself maps to the location of the virtual address within the physical page. MMU 44, when requested by CPU 42, uses the mapping information found in the page tables to translate virtual addresses to corresponding physical addresses in main memory 40. During a memory access, the page tables may indicate that the page that comprises the memory required is not available in main memory 40 and is instead presently stored or paged to disk 48. In such instances, memory manager 26 swaps the required page from disk 48 to main memory 40 and updates the page tables accordingly. In some instances, memory manager 26 uses a variable size memory block scheme called segmentation to implement these virtual memory techniques.

Upon initializing, memory manger 26 of kernel 25 typically allocates a stack and a heap within the virtual address space for use by kernel processes 30-34. Memory manager 26 manages the heaps for kernel processes 30-34 dynamically by temporarily allocating, when requested, blocks of memory for use by the requesting ones of kernel processes 30-34 and freeing the memory when the block of memory is freed by the corresponding one of kernel processes 30-34. Allocated memory blocks on the heap are referenced by a pointer that may be manipulated by kernel processes 30-34. By contrast, stack memory generally is statically allocated when a function is called. Although the techniques are described with respect to the heaps of the various kernel processes 30-34, the techniques are translatable to other portions of memory. For example, the techniques are additionally applicable to the heaps and/or stacks allocated for daemons 22 in the user space, globally-defined variables associated with an execution thread, and memory mapped regions.

Memory manager 26 represents operating system level software that provides an interface with which kernel processes 30-34 request dynamically allocable address space from the system or kernel heap for use by the requesting processes 30-34 at run-time. In some embodiments, the interface is a system call that invokes a kernel function to allocate and return one or more blocks of memory for use by the invoking process. The interface provided by memory manager 26 may, for instance, be invoked using the well-known malloc function call, which invokes the sbrk system call.

Memory manager 26 of operating system 24 performs memory pool allocation by pre-allocating, for multiple block sizes (often of a power of two), a plurality of memory blocks having the same size. Memory manager 26 maintains a directory of memory blocks of various sizes for disbursement to requesting processes, such as kernel processes 30-34. If memory manager 26 exhausts the memory blocks of a certain size, memory manager 26 allocates additional blocks of that size. In some instances, memory manager 26 may additionally use buddy memory allocation, in which memory is allocated in progressively smaller blocks with sizes that may be a power of two. Freed blocks are combined with their "buddy," if also free, to reduce fragmentation.

Typically, as kernel 25 are developed and/or updated, additional features are added and/or improvements are made to optimize kernel operation. Updates to kernels currently being executed are often distributed in the forms of operating system patches. As a result of these changes, the kernel may begin to incrementally utilize more hardware resources with the result that hardware resources available for non-kernel programs (such as daemons 22) have decreased. Users of router 10 may eventually notice this decrease in available hardware resources (meaning hardware resources that are available for use by the user and not allocated for use by kernel 25). In response to this detected decrease in available hardware resources, the users often request from the manufacture or distributor of these devices that the decrease in available hardware resources be fixed. Yet, attempting to identify and overcome issues involving hardware resource use by kernel 25 is a difficult, time intensive process as kernels 25 have become significantly more complicated and provide little, if any, feedback or other type of debugging information that enable identification of issues involving kernel hardware resource use.

In some implementations of kernels, kernels may provide information identifying overall kernel memory use, including information identifying fragmentation of kernel memory (which may also often be referred to as "system memory") identifying how much of the kernel memory is allocated compared to how much is actually utilized. Yet, this overall kernel memory use information may not fully explain which of the kernel subsystems or processes 30-34 are responsible for the loss. Thus, some implementations of kernels provide such kernel memory use as a function of the type (which may refer to the type of kernel process, such as I/O manager, exception handler, processes manager). This finer grained kernel memory use information may facilitate identification of which kernel subsystem or process is responsible for the most amount of waste. However, even this finer grained kernel memory use information explains the use of system or kernel memory use in sufficient detail to enable the developers of the kernel to pinpoint specifically what aspects of these usually very complicated kernel subsystems are resulting in the memory waste.

In accordance with the techniques described in this disclosure, memory manager 26 of kernel 25 may determine memory usage information by both type and allocated memory block size for memory allocated for use by kernel 25 of operating system 24 executing on router 10. The techniques enable kernel 25 to store memory usage information in a two-dimensional data structure, where the horizontal axis of this two dimensional data structure represents the different sizes or amounts of memory blocks being allocated in response to requests for sizes or amounts of memory blocks by subsystems (i.e., kernel processes 30-34 in the example of FIG. 1) of kernel 25, while the vertical axis denotes the different kernel subsystems that issued the memory request. In this manner, the techniques enable the kernel to provide memory usage information at a granularity finer than that typically provided by conventional operating systems in that this memory usage information provides memory use not only by type of kernel sub-system (or so-called "type") but also by the different sizes of the allocated memory blocks per type.

By providing this type-by-allocated size memory usage information, the techniques may facilitate a number of forms of analysis of kernel memory usage at a finer level of detail so as to potentially enable programmers to more easily identify the cause of consumption of memory that eventually leads to a reduction in available memory. For example, by comparing the requested amounts of memory to the size of the corresponding allocated block, the techniques may enable a computing device to determine an extent of memory fragmentation on a per block size basis. In addition, the techniques may enable a computing device to identify occurrences of memory leaks on a per block size basis by comparing a number of requests for amounts of memory to a number of requests to de-allocate the memory blocks allocated in response to these requests for amounts of memory. The techniques may enable such analysis through the generation of this memory usage information in such a manner that this data is stored in terms of the block sizes.

In operation, memory manager 26, in response to requests for amounts of memory, allocates a number of memory blocks from main memory 40 such that the allocated number of memory blocks have two or more different sizes larger than the requested amounts of memory. For example, memory manager 26 may receive a request for 68 bytes of memory from I/O manager 32, such as the "malloc" instruction noted above (where the term "malloc" is a shortened, abbreviated form of the phrase "memory allocation"). As noted above, memory manager 26 typically pre-allocates blocks of memory having different sizes. Often, this pre-allocation scheme involves allocating blocks that are a multiple of 16 bytes. In this pre-allocation scheme, memory manager 26 pre-allocates blocks of size 16 bytes, 32 bytes, 64 bytes, 128 bytes, 256 bytes and 512 bytes, usually stopping at the 512 byte limit (especially when using the buddy memory techniques described above). In response then to the request for 68 bytes of memory, memory manager 26 then allocates one of the blocks of 128 byte size, as the pre-allocated block of 64 bytes is too small to accommodate the requested amount of 68 bytes. Consequently, memory manager 26 may allocate the block of memory having a size of 128 bytes, which is larger than the requested amount of 68 bytes.

Next, memory manager 26 may determine an amount of data stored to each of the allocated number of memory blocks, where the amount of data stored to each of the allocated plurality of memory blocks is less than the respective two or more different sizes of the allocated number of memory blocks. Returning to the example above involving the request for 68 bytes of memory received from I/O manager 32, I/O manager 32 may write its data to the allocated 128 byte block and eventually free this block of memory (often by using a "free" instruction) for use by another kernel process or re-use by I/O manager 32 at a later time. In response to this free instruction, memory manager 26 determine the amount of data stored to this allocated block of memory prior to de-associating this block of memory with I/O manager 32.

To determine the amount of data at the time of freeing this block of memory, memory manager 26 may write the amount of data originally requested via the received request to a so-called "token" associated with this 128 byte block of memory. This token may comprise the last one byte of memory in the allocated 128 byte block of memory in instances where the requested amount of memory does not equal the allocated block size (meaning that when less than the size of the block is requested the token may be stored to the last byte of the allocated block of the memory). If no token is allocated, such as when the requested amount of memory equals one of the block sizes listed above (e.g., 16, 32, 64, 128, 256 or 512 bytes), memory manager 26 may determine that the amount of data originally requested was equal to the size of the corresponding allocated block. Regardless, memory manager 26 typically stores this token (as frequently the originally requested amount of memory does not equal the block size) to the last byte of the allocated block of memory so that upon freeing the memory, memory manager 26 may determine the amount of memory originally requested, as this amount is normally only known and relevant when allocating the block of memory for use by kernel process, I/O manager 32. That is, contrary to conventional memory managers that do not typically store state data concerning memory transactions other than to identify those that have been allocated from those that have only been pre-allocated in the manner described above, memory manager 26 stores this token to maintain some semblance of memory transactional state data indicating the amount originally requested.

Commonly, memory manager 26 stores this token to the last byte of the allocated block in instances where the amount of memory originally requested is less than the size of the allocated block as this memory would otherwise go unused. In some instances, memory manager 26 may store this token to other bytes of what may be referred to as the "unused" portion of the allocated block of memory so long as memory manager 26 is able to recover this token upon freeing the corresponding block of memory. In other instances, memory manager 26 may store these tokens separate from the allocated block of memory, such as in the page table. In addition, the term "block" is not meant to reference a square or any other geometric feature of the allocated portion of the memory, but merely refers to a contiguous portion of memory in terms of addressability.

In any event, when freeing this memory, memory manager 26 may retrieve this token to determine the amount of memory originally requested. Memory manager 26 may also determine the type of this memory allocation based on the free command, which may specify the type of kernel process that issued the free command. In the example above, memory manager 26 may identify the type as I/O manager. In addition, memory manager 26 may determine the size of the allocated block of memory based on this free command and potentially the directory of memory blocks (which may associate starting addresses of the memory block with the size of the memory block). The free command typically specifies the starting address of the block, and memory manager 26 may perform a lookup in the directory using the starting address identified in the free command as a key to determine the size of the memory block to be un-allocated (or "freed").

Upon determining this information, memory manager 26 may generate memory usage information based on the requested amounts of memory, the two or more different sizes of the allocated memory blocks and the amount of data stored to each of the allocated memory blocks. In this sense, the memory usage information specifies usage of the allocated plurality of memory blocks in terms of the two or more different sizes of the allocated memory blocks. As noted above, memory manager 26 may store this memory usage information in a two-dimensional data structure, where the horizontal axis of this two dimensional data structure represents the different sizes or amounts of memory blocks being allocated in response to the requests for amounts of memory of kernel 25, while the vertical axis denotes the different kernel subsystems (i.e., kernel processes 30-34 in the example of FIG. 1) that issued the memory request.

In this manner, the techniques enable the kernel to provide memory usage information at a granularity finer than that typically provided by conventional operating systems in that this memory usage information provides memory use not only by type of kernel sub-system (or so-called "type") but also by the different sizes of the allocated memory blocks per type. In so providing this type-by-allocated size memory usage information, the techniques may facilitate a number of forms of analysis of kernel memory usage at a finer level of detail so as to potentially enable programmers to more easily identify the cause of consumption of memory that eventually leads to a reduction in available memory.

For example, memory manager 26 may store snapshots of this two-dimensional data structures at different times, which may facilitate development of kernel 25 in a manner that reduces waste of memory (which is often expressed as the percentage of the unused portion of the allocated memory in comparison to the total amount allocated). Memory manager 26 may, for example, store snapshots every millisecond, second, minute, 10 minutes or any other conceivable time frequency and provide detailed information as to how various kernel subsystems utilize different block sizes of memory over different periods of execution, such as initialization, the period after initialization when no user space processes are running, during times of light user space process execution, and during times of heavy user space process execution. This information may be invaluable during development to facilitate kernel development that promotes efficient memory usage to avoid high rates of memory (in the 30% and 40% considering that the most waste the above noted exemplary memory allocation scheme may achieve is less than 50%).

As another example, this snapshot aspect of the techniques may be employed to capture changes in memory usage as the kernel is updated and/or patched. That is, memory manager 26 may capture a first snapshot of the two-dimensional data structure storing the memory usage information prior to installation of a patch or update to kernel 25 and then capture a second snapshot of the two-dimensional data structure after installation of the patch or update to kernel 25. Memory manager 26 may then provide these snapshots either as a log for later inspection by developers. The developers may employ separate programs to analyze these snapshots and thereby identify any increases in memory usage both by type and by allocated block size. In providing this type-by-allocated size memory usage information, the techniques may thereby facilitate a number of forms of analysis of kernel memory usage at a finer level of detail so as to potentially enable programmers to more easily identify the cause of consumption of memory that eventually leads to a reduction in available memory.

Memory manager 26 of operating system 24 performs memory pool allocation by pre-allocating, for multiple block sizes (often of a power of two), a plurality of memory blocks having the same size. Memory manager 26 maintains a directory of memory blocks of various sizes for disbursement to requesting processes, such as kernel processes 30-34. If memory manager 26 exhausts the memory blocks of a certain size, memory manager 26 allocates additional blocks of that size. In some instances, memory manager 26 may additionally use buddy memory allocation, in which memory is allocated in progressively smaller blocks with sizes that are a power of two. Freed blocks are combined with their "buddy," if also free, to reduce fragmentation.

Memory manager 26 typically implements a page-based memory system to further virtual memory techniques by partitioning the virtual and physical address spaces into a plurality of fixed-length blocks referred to herein as pages. For example, each page may comprise 4 KB of contiguous address space. As another example, a page may comprise 4 MB of contiguous address space. Memory manager 26 swaps pages in main memory 40 to/from disk 48 using the process described above, which is hereinafter referred to as "paging." The virtual address spaces for daemons 22 include virtual pages that each, if allocated, map to a physical page in main memory 40. Memory manager 26 maintains, for each process, a set of page tables (not shown in FIG. 1) in kernel space that establishes a mapping between a virtual address/virtual page number for the process and one of the physical pages. The virtual address itself maps to the location of the virtual address within the physical page. MMU 44, when requested by CPU 42, uses the mapping information found in the page tables to translate virtual addresses to corresponding physical addresses in main memory 40. During a memory access, the page tables may indicate that the page that comprises the memory required is not available in main memory 40 and is instead presently stored or paged to disk 48. In such instances, memory manager 26 swaps the required page from disk 48 to main memory 40 and updates the page tables accordingly. In some instances, memory manager 26 uses a variable size memory block scheme called segmentation to implement these virtual memory techniques.

Figure 2:
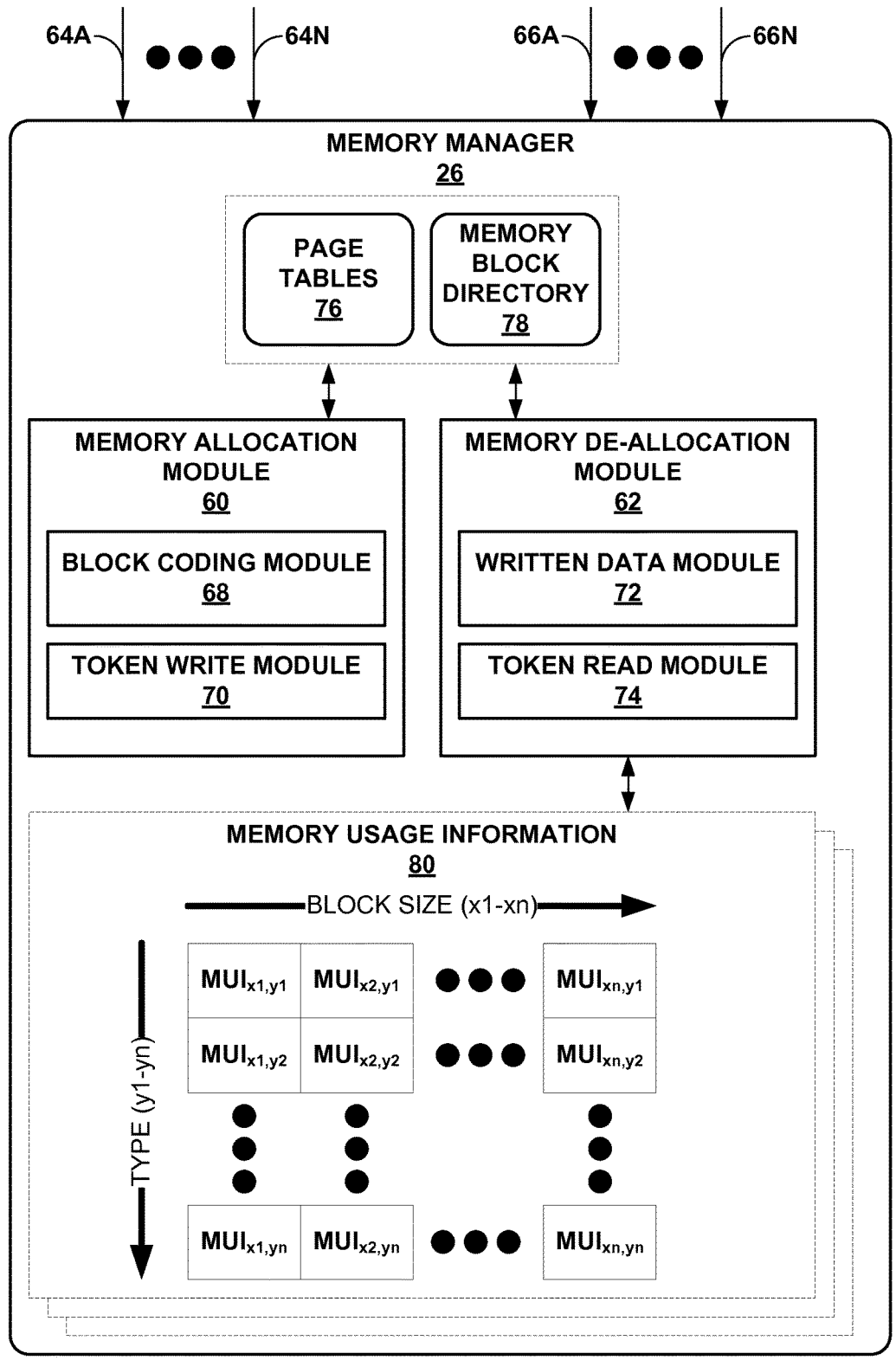
FIG. 2 is a block diagram illustrating in more detail the memory manager included within the computing device shown in the example of FIG. 1.

FIG. 2 is a block diagram illustrating memory manager 26 included within router 10 of FIG. 1 in more detail. In the example of FIG. 2, memory manager 26 includes memory allocation module 60 and memory de-allocation module 62. Memory allocation module 60 performs the pre-allocation operations described above to pre-allocated blocks of different sizes (often sizes that are a power of two) and allocates the blocks memory in response to receiving requests 64A-64N ("amount allocation requests 64") to allocate amounts of memory. An example of an amount allocation request may include a so-called "malloc" function call. Memory de-allocation module 62 may de-allocate one or more of the blocks of memory allocated by memory allocation module 60 in response to requests 66A-66N ("block de-allocation requests 66") to de-allocate these one or more allocated blocks. An example of a block de-allocation request may include a "free" function call.

Memory allocation module 60 includes a block coding module 68 and a token write module 70. Block coding module 68 represents a module that codes one or more pre-allocated blocks or otherwise codes blocks prior to allocation. This block coding module 68 may code a block by writing one or more pre-defined or configured bit sequences (which may represents a "code") to the block. Typically, this code is one or two bytes long, where block coding module 68 repeats this code as many times as necessary to code the entire block. Block coding module 68 may code a block prior to allocation to enable memory de-allocation module 62 to determine whether the kernel sub-system wrote more data to the block that exceeds to originally requested amount, which is typically categorized as an illegal operation. Token write module 70 represents a module that writes the above noted token to the last byte or two of a block prior to being allocated to the kernel sub-system that issued the corresponding request.

Memory de-allocation module 62 includes a written data module 72 and a token read module 74. Written data module 72 represents a module that analyzes a block identified by a free or other de-allocation operation to determine an amount of data actually written to the block. Written data module 72 may determine the amount of data actually written to the block using the code described above. That is, written data module 72 may determine the extent to which the code has been overwritten by data and identify where in the block the code begins, which indicates the amount of data written to the block. Token read module 74 represents a module that reads the above noted token from a block (often the last one or two bytes of the block) prior to de-allocation.

In operation, memory manager 26 receives requests 64, where each of these requests 64 may specify an amount of memory being requested and the above noted "type" identifying the kernel subsystem requesting this amount of memory. In response to receiving each of requests 64, memory manager 26 invokes memory allocation module 60 to process or otherwise handle these requests 64. Memory allocation module 60 access pages tables 76 and memory block director 78 to allocate one of the above-noted pre-allocated blocks of memory. Typically, one of requests 64 requests an amount of memory less than the size of the allocated one of the pre-allocated blocks of memory. For example, request 64A may request 68 bytes of memory. Typically, blocks are pre-allocated in sizes that are a power of two, where a common pre-allocation scheme allocates blocks of 16 bytes, 32 bytes, 64 bytes, 128 bytes, etc. Consequently, memory allocation module 60 selects, in this example, a 128 byte block in response to request 64A for 68 bytes, as any smaller sized block would not be able to satisfy the request. When the requested amount does not equal the size of the allocated block, the unused portion of the block (meaning the portion of the block not used to store the data of the requested amount) may be considered to be wasted, as it is memory that could store data but that is unavailable to store any data corresponding to any other kernel sub-system.

In any event, after selecting the appropriate pre-allocated block, memory allocation module 60 invokes block coding module 68 and token write module 70. Block coding module 68 writes the above described code to the pre-allocated block, while token write module 70 writes the token to the last byte or two of the block (which as noted above is otherwise wasted). This token typically stores the originally requested amount. While described as only storing this originally requested amount, the token may store other information, such as the type, process identifier (PID) associated with the requested kernel sub-system. The techniques, therefore, should not be strictly limited to a token that only stores the originally requested amount. Memory allocation module 60 may, once the selected block is coded and the token has been written to the last byte or two, allocate the selected block to the requested kernel sub-system often by returning a pointer to the requested kernel-sub-system that references the selected block and potentially also specifying the size of the block to which the pointer references. Memory allocation module 60 may respond in this manner to each of requests 64 to the extent memory is available to allocate in response to these requests 64.

Memory manager 26 may also receive requests 66 to free or de-allocate one or more of the previously allocated blocks. In response to each of these requests 66, memory manager 26 may invoke memory de-allocation module 62 to process or otherwise handle each of these requests 66. Each of these de-allocation requests 66 may specify the type of kernel sub-system that issued the corresponding one of requests 66, as well as, the pointer to the block originally provided in response to the one of requests 64 requesting this block of memory (or, rather, the amount of memory for which this block was allocated). Based on this pointer, memory de-allocation module 62 may determine the address of the block of memory and perform a lookup in page tables 76 and/or memory block directory 78 using this address as a key to identify the size of the block.

Memory de-allocation module 62 may then invoke written data module 72 passing the determined address of the start of the block to the written data module 72 and the determined size of the block. Written data module 72 may then determine, through analysis of the extent to which the code remains intact in the block, the amount of data written to the block. Written data module 72 may then store this amount of data written to memory usage information 80.

Memory de-allocation module 62 may also invoke token read module 74, passing the address and size of the block to token read module 74. Token read module 74 may then access the last byte or two of the block by adding the size of the block minus one or two bytes to the address and accessing the resulting address. Token read module 74 may then store the token to memory usage information 80.

Memory usage information 80, as shown in the example of FIG. 2, represents a data structure, such as a table, a two-dimensional array, a two-dimensional dynamic linked list or any other suitable data structure, that stores memory usage information by both block size and type. In this example, the x-axis of memory usage information 80 increases in size from x1 to xn, where x1 may identify block sizes of 16 bytes and xn may identify the largest block size of a power of two, such as 512 bytes. The y-axis of memory usage information 80 corresponds to the type, which may also refer to a number associated with a particular kernel sub-system. The smallest type may be denoted "y1" while the largest type may be denoted as "yn." Written data module 72 may therefore store the amount of data written to the exemplary 128-byte by a type of "1" by locating memory usage information associated with the corresponding block size and the corresponding type in the data structure. Written data module 72 may then store the amount of data written to this portion of memory usage information 80. If a block size of 128 bytes corresponds to x4 and the type of 1 corresponds to y1, written data module 72 stores the amount of data written to the portion (which may represent a node or cell) of memory usage information 80 denoted memory usage information x4, y1 ($MUI_{x4,y1}$). Likewise, for this same block, token read module 74 may store the originally requested amount (which may, again, be referred to as the token) to $MUI_{x4,y1}$.

While described as storing so-called "raw" or unprocessed data, such as the amount of memory originally requested and the amount of data written, the techniques may accommodate any information related to memory usage that may be stored in this granular manner, including information derived from this processed data, such as an amount and/or percentage of memory wasted and a total amount and/or percentage of memory wasted per block size and type. Typically, this memory usage information 80 running totals of memory wasted, data amounts written, data amounts originally requested, data amounts illegally written (which occurs when the data amounts written exceed the data amounts originally requested), as well as, percentages of memory wasted, all of which are maintained on a per block size and type basis.

Memory usage information 80 may be provided on-demand or periodically to other kernel modules, user space programs, such as CLI 22C, or even external devices for further analysis. This analysis may reveal the extent of, for example, illegal data writes. The analysis may also reveal "memory creep," which may refer to small increases in memory utilization over time by specific structures and allocation paths. The analysis may also identify memory leaks if the number of requests 64 exceeds the number of requests 66. In this instance, memory manager 26 may store a running tally of requests 64 and requests 66 to memory usage information 80 on a per type and block size in the manner described above.

The process of generating memory usage information 80 may continue in this manner with respect to each of requests 64 and 66. Memory manager module 26 may routinely capture so-called snapshots of this memory usage information 80 (which may refer to historical versions of memory usage information 80), often capturing and storing these snapshots on a periodic basis. In addition, memory manager 26 may, whether automatically or in response to user input, capture snapshot prior to and post kernel updates. These snapshots are reflected by the collection of dotted dashed boxes denoted "memory usage information." These snapshots may enable analysis of kernel memory usage not only by block size and type but also by time. This analysis over time may reveal memory usage per block size and type over kernel updates and provide additional memory usage information that may identify memory creep (which may refer to the expansion of memory use) by various kernel subsystems.

In this manner, the techniques described in this disclosure enable the kernel to store memory usage information in a two-dimensional data structure, where the horizontal axis of this two dimensional data structure represents the different sizes or amounts of memory blocks being allocated in response to requests for sizes or amounts of memory blocks by subsystems (which may also be referred to as "kernel processes") of the kernel, while the vertical axis denotes the different kernel subsystems that issued the memory request. In this manner, the techniques enable the kernel to provide memory usage information at a granularity finer than that typically provided by conventional operating systems in that this memory usage information provides memory use not only by type of kernel sub-system (or so-called "type") but also by the different sizes of the allocated memory blocks per type. By providing this type-by-allocated size memory usage information, the techniques may facilitate a number of forms of analysis of kernel memory usage at a finer level of detail so as to potentially enable programmers to more easily identify the cause of consumption of memory that eventually leads to a reduction in available memory.

To illustrate, a user may interface memory manager 26 via CLI 22C (shown in FIG. 1) entering commands to view or otherwise retrieve memory usage information 80. For example, a user may enter the following exemplary commands to CLI 22C:

| admin@host# show memory_usage_log_current | | | | |
|---|---|---|---|---|
| type | 16 bytes | 32 bytes | 64 bytes | 128 bytes |
| 1 | 12% waste | 20% waste | 23% waste | 33% waste |
| 2 | 13% waste | 23% waste | 18% waste | 37% waste |
| 3 | 45% waste | 15% waste | 19% waste | 14% waste |
| 4 | 10% waste | 23% waste | 16% waste | 28% waste |
| 5 | 11% waste | 17% waste | 30% waste | 44% waste |

In the example above, a user denoted "admin" has logged into CLI 22C and received the admin@host# prompt, whereupon this admin has entered the command show memory_usage_log_current. This command causes CLI 22C to interface with memory manager 26 to take a current snapshot of memory usage information 80 and return this current snapshot to CLI 22C, which CLI 22C has displayed in the form of a table having the types in each row and a columns of block sizes. In each element of the table, the corresponding percentage of memory wasted is shown per type and block size. Although only percentage waste is shown, as noted above, this memory usage information 80 may include any number of other types of information and the techniques should not be limited in this respect to the example shown above. In any event, from this table, the admin may note that type 3 usage of 16 byte memory blocks results in a large amount of waste. Also, the admin may note that use by type 5 of 64 byte and 128 byte blocks results in comparatively large amount of waste. Thus, the admin, which may be a software developer, may inspect the source code in an attempt to identify the source of this waste and potentially update or otherwise alter this code to reduce the waste.

As another example, a user may enter the following exemplary commands to CLI 22C in order to inspect changes over time:

| | admin@host# show\|compare memory_usage_log_current\| memory_usage_log_prev | | | |
|---|---|---|---|---|
| type | 16 bytes | 32 bytes | 64 bytes | 128 bytes |
| 1 | 1% waste | −2% waste | −5% waste | 5% waste |
| 2 | −3% waste | −6% waste | −5% waste | −4% waste |
| 3 | 20% waste | 3% waste | −3% waste | −6% waste |
| 4 | −13% waste | −10% waste | −5% waste | 20% waste |
| 5 | −8% waste | 4% waste | 12% waste | 23% waste |

In this example, the admin has entered a command to show a comparison of the current snapshot of memory usage information 80 and a previous snapshot of memory usage information 80. In response to this command, CLI 22C interface with memory manager 26 to retrieve the current and previous snapshots of memory usage information 80 and compares the percentage waste to generate differences in percentage waste over time per type and block size. The admin may note that use of 64 byte and 128 byte blocks by type 5 resulted in a drastic increase in waste between the previous and current snapshots of memory usage information 80. Between the previous and current snapshot, a patch or other update to the kernel may have been applied and the admin, which again may be a software developer, may use this difference between the current and previous snapshots to identify potential software bugs or memory usage issues resulting from update and patches. The previous and current snapshots may also represent differences in memory usage during startup and upon active operation, where the difference may reflect differences in memory usage over time of operation and not necessarily differences between different versions of the kernel.

The previous examples represent just two of any number of examples that the techniques may enable. In addition, the techniques may enable an admin to download or otherwise retrieve one or more snapshots of memory usage information 80 for comprehensive analysis on other computing devices. These other computing devices may execute software for analyzing these snapshots, where this software may generate graphs from or otherwise present memory usage information 80 graphically. In addition, memory manager 26 may routinely take a snapshot of memory usage information 80 and automatically forward this snapshot to a server or other repository for analysis by software developers of the kernel. In any event, the techniques may facilitate the generation of memory usage information 80 that represents memory usage information regarding use of memory both by type and block size so as to facilitate the analysis of memory usage by block size within a kernel by various kernel sub-systems.

Figure 3A:
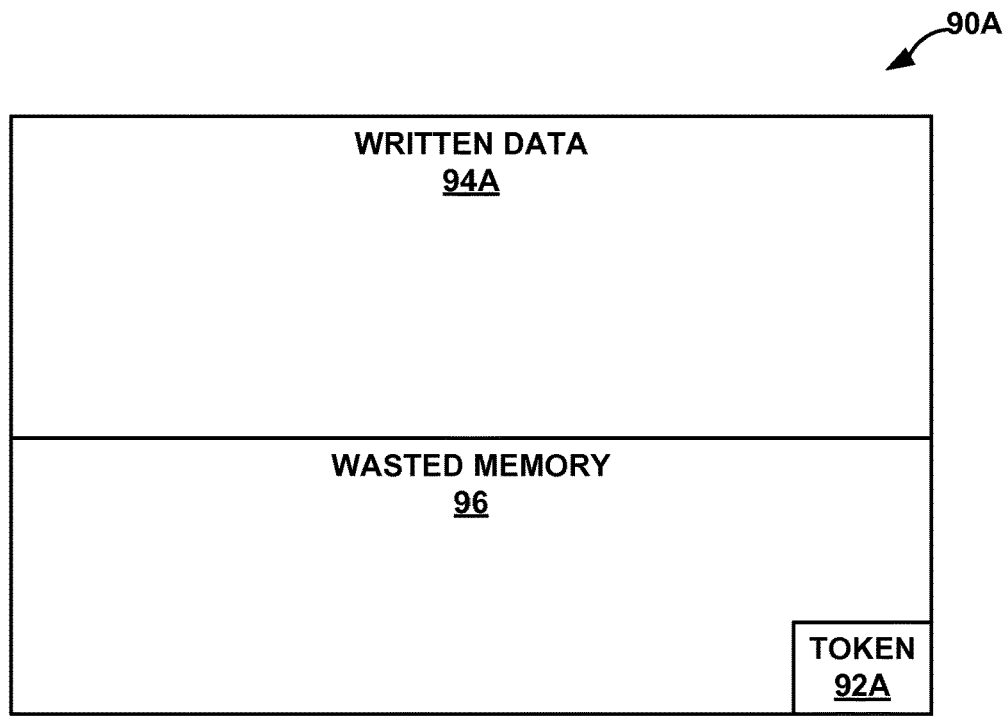
FIGS. 3A, 3B are diagrams illustrating a state of exemplary memory blocks prior to de-allocation that include respective tokens consistent with the techniques of this disclosure.
Figure 3B:
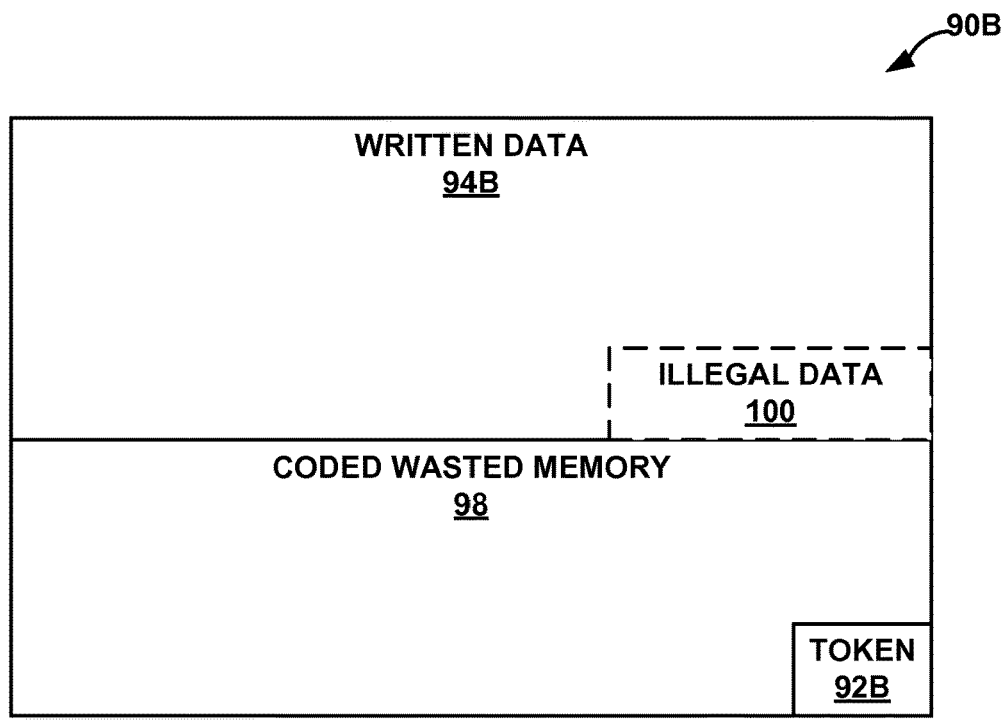

FIGS. 3A, 3B are diagrams illustrating a state of exemplary memory blocks 90A, 90B prior to de-allocation that include respective tokens 92A, 92B consistent with the techniques of this disclosure. In the example of FIG. 3A, it is assumed that block coding module 68 and written data module 72 shown in the example of FIG. 2 are not employed to code block 80A and determine written amounts of data. These modules may not be invoked to improve memory allocation and de-allocation speeds or to otherwise facilitate memory management. Moreover, block coding module 68 and written data module 72 may only be enabled by an administrator or other user when memory leaks or other memory issues are suspected. Thus, block 90A includes written data 94A and wasted memory 96. Token write module 70 writes token 92A to the last byte of wasted memory 96. Token read module 74 may read this token and update memory usage information 80 in the manner described above using the type (typically specified in the one of requests 66) and the size (determined through the lookup to pages tables 76 and memory block director 78) as indexes into the appropriate one of the MUI nodes of memory usage information 80.

In the example of FIG. 3B, it is assumed that block coding module 68 and written data module 72 are enabled, where block coding module 68 wrote a code to the entire portion of block 90B and the kernel sub-system overwrote a portion of this coded data with written data 94B. In this instance, block 90B includes a portion denoted "coded wasted memory 98" that represents the portion of block 90B that was coded and allocated for use by this kernel sub-system that it did not use to store data. Written data module 72 may analyze block 90B to determine that size of coded wasted memory 98 and compare subtract the size of coded wasted memory 98 from the total size of the allocated block to determine the amount of data written to the block. Written data module 72 may then update memory usage information 80 in the manner described above to store this amount of data written to (and/or update running totals stored in) the appropriate one of MUI node of memory usage information 80. Likewise, token read module 74 may read token 92B and update the appropriate one of MUI nodes of memory usage information 80.

Through analysis of this memory usage information 80, the amounts of data written in excess of the originally requested amount (which is denoted as "illegal data 100" in FIG. 3B) may be determined. Access to the amount of this illegal data 100 on a per block and type basis may provide valuable insight into incorrect memory usage among the various kernels which may help identify unintended side effects that result in increased resource usage, which, in large scale, decreases the resources available on the system. In addition, access to the amount of this illegal data 100 on a per block and type basis may provide valuable insight into incorrect memory usage among the various kernels which may potentially prevent overwrites of data, such as may occur when a process requests data and then writes enough data to consume the entire allocated block and another adjacent block of data (which may be allocated for storing data associated with an entirely different kernel sub-system).

Figure 4:
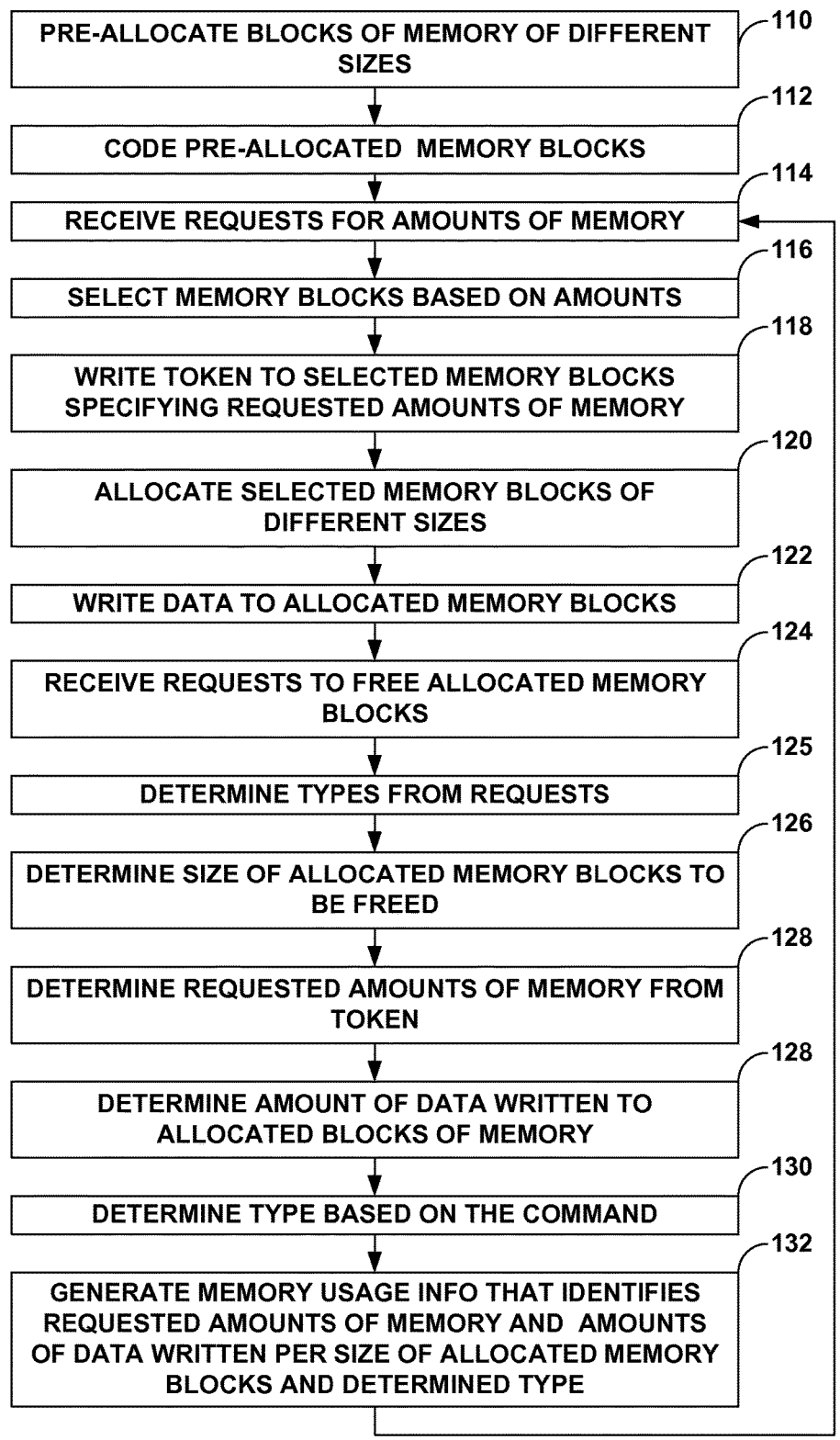
FIG. 4 is a flowchart illustrating exemplary operation of a computing device in implementing the techniques described in this disclosure.

FIG. 4 is a flowchart illustrating exemplary operation of a computing device, such as router 10 shown in the example of FIG. 1, in implementing the techniques described in this disclosure. In particular, the flowchart shown in the example of FIG. 4 illustrates operation of memory manager 26 (shown in the example of FIG. 2) of router 10 in implementing the techniques described in this disclosure. While described in this disclosure with respect to a particular module of a particular device, the techniques may be implemented by any general computing device that provides some form of memory management.

Initially, memory manager 26 may pre-allocate blocks of memory of different sizes in the manner described above (110). In some instances, upon pre-allocated these blocks, memory manager 26 may invoke block coding module 68 of memory allocation module 60 to code these pre-allocated memory blocks, as describe above (112). Memory manager 26 may receive requests 64 for amounts of memory and select, for each of requests 64, pre-allocated memory blocks based on the corresponding requested amount (114, 116). In response to these requests 64, memory manager 26 invokes memory allocation module 60, which in turn invokes token write module 70, passing the originally requested amounts to token write module 70. Token write module 70 writes a token to the last byte or two of each of the selected pre-allocated memory blocks specifying the requested amounts of memory, again, as described above (118). Memory allocation module 60 then allocates the selected blocks of memory of different sizes to the requesting one of the kernel sub-systems that issued the requests, commonly returning a pointer referencing the starting address of the block and a size of the allocated block in response to each of requests 64 (120).

After allocating the blocks, the corresponding kernel sub-systems may write data to the allocated memory blocks using the pointers (122). When the data written to the allocated block is no longer required, the kernel sub-systems generate requests 66 requesting to free the allocated blocks identified by the pointer included with each of requests 66. Memory manager 26 may receive requests 66 to free or de-allocate allocated memory blocks (124). Memory manager 26 may invoke memory de-allocation module 62 to process each of requests 66, which, as described above, determines the types from the requests and the sizes of allocated memory blocks to be freed (125, 126). Memory de-allocation module 62 may invoke token read module 74, passing the pointers identifying the blocks from which its corresponding token should be read and the determined sizes. Token read module 74 reads the tokens in the manner described above and thereby determines the requested amounts of memory from the token (128). Memory de-allocation module 62 may also invoke written data module 72 that determines the amount of data written to the allocated blocks of memory, also as described above (130). As further described above, memory de-allocation module 62 then generates memory usage information 80 that identifies one or more of the requested amount of memory and the amounts of data written per size of allocated memory blocks and type (132).

In this manner, the techniques of this disclosure may enable an automated way by which a computing device may generate memory usage information that provides a fine-grain (in comparison to conventional memory usage information) data concerning usage of a memory. This memory usage information is more fine-grained because it stores memory usage information not only by type but also by block size. By providing this more fine-grained memory usage information, the techniques may enable more subtle analysis of specific memory utilization. For example, the techniques may permit an analysis that identifies increases of waste by one block size for a given type and decreases of waste in another block size for this type. In conventional memory usage information, the increase and decrease in waste for these block sizes would have been obscured (as they offset one another), while the techniques may enable computing devices to generate memory usage information that uncovers the increase in such offsetting changes in wastes. Moreover, the techniques, through generating this memory usage information, may enable developers to establish norms by which to evaluate waste on a per block size basis and per individual types.

The techniques described in this disclosure may be implemented in hardware or in any combination of hardware and software and/or firmware. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

When implemented in a combination of hardware and software, the functionality ascribed to the systems and devices described in this disclosure may be embodied as instructions on a non-transitory computer-readable medium, such as random access memory (RAM), read-only memory (ROM), non-volatile random access memory (NVRAM), electrically erasable programmable read-only memory (EEPROM), FLASH memory, magnetic media, optical media, or the like. One or more processors (where the term "processor" is used to refer to any of the hardware listed above or their equivalents) may execute the instructions to support one or more aspects of the functionality described in this disclosure. In some instances, the techniques may be executed by a control unit, which may refer to either an implementation of the techniques that involves hardware solely or one that involves a combination of hardware and software.

Various embodiments of the invention have been described. These and other embodiments are within the scope of the following claims.

The invention claimed is:

1. A method comprising:
in response to requests for amounts of memory, allocating a plurality of memory blocks from a memory of a computing device such that each of the allocated plurality of memory blocks conform to two or more different memory block sizes, wherein at least one of the allocated memory blocks is larger than the requested amount of memory for which the memory block was allocated;
in response to requests to de-allocate one or more of the allocated plurality of memory blocks and for each of the memory blocks to be de-allocated, determining the amount of memory originally requested for the memory block to be de-allocated, analyzing the memory block to be de-allocated to determine an amount of the memory block to be de-allocated to which data was written subsequent to the allocation of the memory block to be deallocated, and determining the one of the two or more different memory block sizes from which the memory block to be de-allocated was allocated, wherein the amount of at least one of the memory blocks to be de-allocated to which data was written is less than the amount of memory originally requested for the at least one of the memory blocks to be de-allocated; and
generating, for each of the two or more different memory block sizes, memory usage information that specifies both the requested amounts of memory and the amount of the memory blocks to be de-allocated to which the data was written for that memory block size.

2. The method of claim 1, further comprising executing a kernel having a plurality of kernel sub-systems of various types,
wherein at least one of the kernel sub-systems generates the requests for the amounts of memory and the requests to de-allocate the one or more of the allocated plurality of memory blocks, wherein the request to de-allocate the one or more of the allocated plurality of memory blocks identifies the corresponding one of the various types of the at least one of the kernel sub-system, wherein the method further comprises determining the one of the various types of the at least one of the kernel sub-system from each of the requests to de-allocate the one or more of the allocated plurality of memory blocks, and wherein generating the memory usage information comprises generating the memory usage information to specify the determined requested amounts of memory in terms of the two or more different sizes of the allocated plurality of memory blocks and the determined ones of the various types.

3. The method of claim 1, further comprising, when allocating the plurality of memory blocks in response to the requests for amounts of memory, writing a token to each of the plurality of memory blocks, wherein the token specifies the requested amount of memory specified in the corresponding one of the requests, wherein determining the corresponding requested amounts of memory comprises reading the token from the corresponding one of the allocated plurality of memory blocks that specifies the requested amount of memory specified in the corresponding one of the requests.

4. The method of claim 3, wherein writing the token to each of the plurality of memory blocks comprises writing the token to the last byte of each of the plurality of memory blocks when the requested amount of memory is less than a size of the one of the plurality of memory blocks allocated in response to the one of the requests that specifies the requested amount of memory.

5. The method of claim 1, further comprising:
when allocating a plurality of memory blocks in response to the requests for the amounts of memory, coding each of the plurality of memory blocks with a code so as to enable the determination of the amount of memory to which the data was written for each of the one or more allocated plurality of memory blocks,
wherein analyzing each of the memory blocks to be de-allocated to determine the amount of the memory block to be de-allocated to which the data was written comprises determining a location within the memory blocks to be de-allocated to identify where the data ends and the code starts after at least a portion of the code has been overwritten by the data written to the memory block to be de-allocated.

6. The method of claim 5,
wherein the code comprises a one-byte code or a two-byte code, and
wherein coding each of the plurality of memory blocks with the code comprises writing either the one-byte code or the two-byte code to each of the plurality of memory blocks repeating either the one-byte code or the two-byte code as many times as is required to code each of the plurality of memory blocks in their entirety.

7. The method of claim 1, further comprising, when de-allocating the one or more of the allocated plurality of memory blocks in response to the requests to de-allocate the one or more of the allocated plurality of memory blocks, determining an amount of illegal data written to each of the one or more of the plurality of allocated memory blocks based on the requested amount of data and the determined amount of the memory block to be de-allocated to which the data was written, wherein generating the memory usage information comprises generating the memory usage information to specify the determined requested amounts of memory, the determined amount of the memory block to be de-allocated to which the data was written and the determined amount of illegal data written to each of the one or more of the plurality of allocated memory blocks in terms of the two or more different sizes of the allocated plurality of memory blocks.

8. The method of claim 1, further comprising:
executing a kernel of an operating system having a plurality of kernel sub-systems of various types with the computing device;
capturing a first snapshot of the memory usage information at a first time of executing the kernel; and
capturing a second snapshot of the memory usage information at a second time of executing the kernel, wherein the first time precedes the second time.

9. The method of claim 8,
wherein the first time occurs before one of an update or a patch to the kernel, and
wherein the second time occurs after the one of the update or the patch to the kernel.

10. The method of claim 1, further comprising:
presenting a user interface that receives commands requesting the memory usage information; and
providing the memory usage information as a report in response to the commands.

11. The method of claim 1, further comprising:
determining a number of the requests for the amount of memory;
determining a number of the requests to de-allocate the one or more of the allocated plurality of memory blocks;
wherein generating the memory usage information comprises generating the memory usage information to specify the determined requested amounts of memory, the determined number of the requests for the amounts of memory, the determined number of the requests to de-allocate the one or more of the allocated plurality of memory blocks in terms of the two or more different sizes of the allocated plurality of memory blocks.

12. The method of claim 11, further comprising determining an occurrence of one or more memory leaks per each of the two or more different sizes of the allocated plurality of memory blocks based on the determined number of the requests for amounts of memory defined in the memory usage information and the determined number of the requests to de-allocate the one or more of the allocated plurality of memory blocks in the memory usage information.

13. The method of claim 1, further comprising determining an amount of memory fragmentation per each of the two or more different sizes of the allocated plurality of memory blocks based on the determined requested amounts of memory.

14. The method of claim 1, wherein the computing device comprises a router.

15. A computing device, comprising:
a memory;
a control unit that executes a kernel of an operating system having a plurality of kernel sub-systems,
wherein one of the kernel sub-systems comprises a memory manager that, in response to requests for amounts of the memory from at least one other one of the kernel sub-systems, allocates a plurality of memory blocks from the memory such that each of the allocated plurality of memory blocks have two or more different sizes, wherein at least one of the allocated memory blocks is larger than the requested amounts of memory for which the memory block was allocated, wherein the memory manager, in response to requests to de-allocate one or more of the allocated plurality of memory blocks from the at least one other one of the kernel sub-systems and for each of the memory blocks to be de-allocated, determines the amount of memory originally requested for the memory block to be de-allocated, analyzes the memory block to be de-allocated to determine an amount of the memory block to be de-allocated to which data was written subsequent to the allocation of the memory block to be deallocated, and determines one of the two or more different sizes from which the memory block to be de-allocated was allocated, wherein the amount of at least one of the memory blocks to be de-allocated to which data was written is less than the amount of memory originally requested for the at least one of the memory blocks to be de-allocated, and wherein the memory manager generates, for each of the two or more different memory block sizes, memory usage information that specifies both the requested amounts of memory and the amount of data stored to each of the one or more allocated plurality of memory blocks to be de-allocated for that block size.

16. The computing device of claim 15,
wherein the plurality of kernel sub-systems have various types, and
wherein at least one of the kernel sub-systems generates the requests for the amounts of memory and the requests to de-allocate the one or more of the allocated plurality of memory blocks, wherein the request to de-allocate the one or more of the allocated plurality of memory blocks identifies the corresponding one of the various types of the at least one of the kernel sub-system,
wherein the memory manager determines the one of the various types of the at least one of the kernel sub-system from each of the requests to de-allocate the one or more of the allocated plurality of memory blocks and generates the memory usage information to specify the determined requested amounts of memory in terms of the two or more different sizes of the allocated plurality of memory blocks and the determined ones of the various types.

17. The computing device of claim 15, wherein the memory manager, when allocating the plurality of memory blocks in response to the requests for amounts of memory, writes a token to each of the plurality of memory blocks, wherein the token specifies the requested amount of memory specified in the corresponding one of the requests and determines the corresponding requested amounts of memory by reading the token from the corresponding one of the allocated plurality of memory blocks that specifies the requested amount of memory specified in the corresponding one of the requests.

18. The computing device of claim 17, wherein the memory manager writes the token to the last byte of each of the plurality of memory blocks when the requested amount of memory is less than a size of the one of the plurality of memory blocks allocated in response to the one of the requests that specifies the requested amount of memory.

19. The computing device of claim 15, wherein the memory manager, when allocating a plurality of memory blocks in response to the requests for the amounts of memory, codes each of the plurality of memory blocks with a code so as to enable the determination of the amount of the memory block to be de-allocated to which the data was written and analyzes the memory block to be de-allocated to determine a location within the memory block to be-deallocated where the data ends and the code starts after at least a portion of the code has been overwritten by the data written to the memory block-to be de-allocated so as to determine the amount of the memory block to be de-allocated to which the data was written.

20. The computing device of claim 19,
wherein the code comprises a one-byte code or a two-byte code, and
wherein the memory manager writes either the one-byte code or the two-byte code to each of the plurality of memory blocks repeating either the one-byte code or the two-byte code as many times as is required to code each of the plurality of memory blocks in their entirety.

21. The computing device of claim 15, wherein the memory manager, when de-allocating the one or more of the allocated plurality of memory blocks in response to the requests to de-allocate the one or more of the allocated plurality of memory blocks, further determines an amount of illegal data written to each of the one or more of the plurality of allocated memory blocks based on the requested amount of data and the determined amount of the memory block to be de-allocated to which the data was written and generates the memory usage information to specify the determined requested amounts of memory, the determined amount of the memory block to be de-allocated to which the data was written and the determined amount of illegal data written to each of the one or more of the plurality of allocated memory blocks in terms of the two or more different sizes of the allocated plurality of memory blocks.

22. The computing device of claim 15,
wherein the kernel includes a plurality of kernel sub-systems of various types, and
wherein the memory manager captures a first snapshot of the memory usage information at a first time of executing the kernel and captures a second snapshot of the memory usage information at a second time of executing the kernel, wherein the first time precedes the second time.

23. The computing device of claim 22,
wherein the first time occurs before one of an update or a patch to the kernel, and
wherein the second time occurs after the one of the update or the patch to the kernel.

24. The computing device of claim 15, wherein the control unit further executes a user interface module that presents a user interface that receives commands requesting the memory usage information and provides the memory usage information in response to the commands.

25. The computing device of claim 15, wherein the memory manager determines a number of the requests for the amount of memory, determines a number of the requests to de-allocate the one or more of the allocated plurality of memory blocks, generates the memory usage information to specify the determined requested amounts of memory, the determined number of the requests for the amounts of memory, the determined number of the requests to de-allocate the one or more of the allocated plurality of memory blocks in terms of the two or more different sizes of the allocated plurality of memory blocks.

26. The computing device of claim 25, wherein the memory manager determines an occurrence of one or more memory leaks per each of the two or more different sizes of the allocated plurality of memory blocks based on the determined number of the requests for amounts of memory defined in the memory usage information and the determined number of the requests to de-allocate the one or more of the allocated plurality of memory blocks in the memory usage information.

27. The computing device of claim 15, wherein the memory manager determines an amount of memory fragmentation per each of the two or more different sizes of the allocated plurality of memory blocks based on the determined requested amounts of memory.

28. The computing device of claim 15, wherein the computing device comprises a router.

29. A non-transitory computer-readable medium comprising instructions for causing a one or more processors to:

in response to requests for amounts of memory, allocate a plurality of memory blocks from a memory of a computing device such that each of the allocated plurality of memory blocks conform to two or more different memory block sizes, wherein at least one of the allocated memory blocks is larger than the requested amount of memory for which the memory block was allocated;

response to requests to de-allocate one or more of the allocated plurality of memory blocks and for each of the memory blocks to be de-allocated, determine the amount of memory originally requested for the memory block to be de-allocated, analyze the memory block to be de-allocated to determine an amount of the memory block to be de-allocated to which data was written subsequent to the allocation of the memory block to be deallocated, and determine the one of the two or more different memory block sizes from which the memory block to be de-allocated was allocated, wherein the amount of at least one of the memory blocks to be de-allocated to which data was written is less than the amount of memory originally requested for the at least one of the memory blocks to be de-allocated; and generate, for each of the two or more different memory block sizes, memory usage information that specifies both the requested amounts of memory and the determined amount of data stored to each of the allocated plurality of memory blocks to be de-allocated for that memory block size.

30. The non-transitory computer-readable medium of claim 29, wherein the instruction further cause the one or more processors to execute a kernel having a plurality of kernel sub-systems of various types, wherein at least one of the kernel sub-systems generates the requests for the amounts of memory and the requests to de-allocate the one or more of the allocated plurality of memory blocks, wherein the request to de-allocate the one or more of the allocated plurality of memory blocks identifies the corresponding one of the various types of the at least one of the kernel sub-system, wherein the instruction further cause the one or more processors to:

determine the one of the various types of the at least one of the kernel sub-system from each of the requests to de-allocate the one or more of the allocated plurality of memory blocks, and generate the memory usage information to specify the determined requested amounts of memory in terms of the two or more different sizes of the allocated plurality of memory blocks and the determined ones of the various types.

31. The non-transitory computer-readable medium of claim 29, wherein the instruction further cause the one or more processors to:

when allocating the plurality of memory blocks in response to the requests for amounts of memory, write a token to each of the plurality of memory blocks, wherein the token specifies the requested amount of memory specified in the corresponding one of the requests, and read the token from the corresponding one of the allocated plurality of memory blocks that specifies the requested amount of memory specified in the corresponding one of the requests.

32. The non-transitory computer-readable medium of claim 31, wherein the instructions further cause the one or more processors to write the token to the last byte of each of the plurality of memory blocks when the requested amount of memory is less than a size of the one of the plurality of memory blocks allocated in response to the one of the requests that specifies the requested amount of memory.

* * * * *